(12) United States Patent
Dauer

(10) Patent No.: US 9,434,136 B1
(45) Date of Patent: Sep. 6, 2016

(54) DAUER BOARD

(71) Applicant: Monte Phillip Dauer, San Jose, CA (US)

(72) Inventor: Monte Phillip Dauer, San Jose, CA (US)

( * ) Notice: Subject to any disclaimer, the term of this patent is extended or adjusted under 35 U.S.C. 154(b) by 0 days.

(21) Appl. No.: 14/742,430

(22) Filed: Jun. 17, 2015

(51) Int. Cl.
| | |
|---|---|
| *B32B 3/06* | (2006.01) |
| *B32B 21/04* | (2006.01) |
| *B32B 5/02* | (2006.01) |
| *B32B 21/14* | (2006.01) |
| *B32B 7/12* | (2006.01) |
| *B32B 21/02* | (2006.01) |

(52) U.S. Cl.
CPC ............ *B32B 21/042* (2013.01); *B32B 5/028* (2013.01); *B32B 7/12* (2013.01); *B32B 21/02* (2013.01); *B32B 21/14* (2013.01); *B32B 2262/103* (2013.01); *B32B 2419/04* (2013.01); *B32B 2479/00* (2013.01); *B32B 2605/12* (2013.01)

(58) Field of Classification Search
CPC .................................... B32B 21/042
USPC ......................................................... 428/106
See application file for complete search history.

(56) References Cited

U.S. PATENT DOCUMENTS

| | | | | |
|---|---|---|---|---|
| 2,428,325 | A | 9/1947 | Collins | |
| 2008/0127587 | A1* | 6/2008 | McIntire | E04D 1/28 52/309.12 |
| 2008/0152862 | A1* | 6/2008 | Idestrup | B32B 5/12 428/106 |

FOREIGN PATENT DOCUMENTS

CN          201704865 U       1/2011

\* cited by examiner

*Primary Examiner* — Brent O'Hern
(74) *Attorney, Agent, or Firm* — IP Clinic at Lincoln Law School

(57) ABSTRACT

Approaches herein describe reinforced wood plywood panels comprising multiple layers of wood veneer alternated by wire mesh bonded with glue, epoxy or other approved adhesive via pressure and heat. The number of wire mesh layers number greater than two and separated by wood veneer layers. By creating alternating directions of wire mesh the rigidity and weight barring capabilities of the plywood is greatly enhanced while keeping its weight to a minimum.

4 Claims, 2 Drawing Sheets

DAUER BOARD

FIELD OF THE INVENTION

The present invention generally relates to the process and construction of reinforced plywood building materials.

BACKGROUND

A wide variety of plywood is available on the market and used in general construction and in specialty building fixtures. Some common locations are in house framing for sheer wall construction, in floor or roof underlayment, in concrete form work or even some furniture box formation or in the marine industry for hull or bulkhead construction.

Laminated plywood offers many advantages over other solid lumber members of the same size and shape such as higher strength to weight ratios, ability to accept various fasteners without splitting and the ability to be formed into simple shapes and curves without breaking.

SUMMARY

Described herein are various embodiments that disclose various types of plywood and other laminated wood composites. In various embodiments, plywood consists of multiple thin panels made at least in part of wood fibers. "chips," particles, or veneers of wood layered in alternating directions so as to substantially randomize or "crisscross" said fibers to one another impregnated with glue, epoxy or other adhesive and formed under heat and pressure until the components are properly bonded and cured. These panels are then placed in multiple layers alternating their grain direction to each other so as to increase the thickness of the completed product to a desired standardized thickness and bonded or laminated with glue or other adhesive between the alternating layers of formed panels and bonded under heat and pressure.

Non-reinforced plywood panels typically require thicker panels to provide increased strength. Unfortunately, as the thickness increases to provide the desired strength the weight increases proportionally. Embodiments disclosed herein describe adding metal wire mesh and infusing it between the layers of wood veneer provides for the increased strength without the increased weight and increased dimensional thickness found undesirable by earlier embodiments.

The product described herein, increases the strength of the material at the same time reducing the weight of the end product, reducing the thickness of the panels needed and thus reducing the number of veneer sheets needed to produce panels of equivalent strength.

DETAILED DESCRIPTION

As described above, various embodiments herein describe wire mesh reinforced structural plywood. This plywood can be constructed in multiple layers to produce plywood of a desired thickness as commonly used in the construction industry so as to conform to standard building practices. Embodiments described herein alleviate the need for thicker plywood panels thus saving weight, handling exertion, and dimensional requirements.

As described herein, in some embodiments, panels are constructed by alternating a bottom layer of wood laminate sheet; wire mesh; substantially alternated direction of wood laminate sheet; wire mesh; wood laminate sheet; with wood glue, epoxy or other adhesive applied between each layer of wood laminate sheet. This layering can be added to in order to accomplish the desired thickness with the number of layers of wire mesh added to increase the strength of the end product as desired.

Wherein once the desired thickness is achieved the panel is then subjected to high pressure and heat so as to completely bond the structure to itself and to cure the adhesive to the panels.

In various embodiments, a wire mesh fabric includes mesh fabric constructed of metal wire woven or welded to form an open grid by which the bonding adhesive can freely flow. In some embodiments, wire mesh can include any form of mess, rods, individual wire(s), metal sheeting, and/or perforated metal sheeting.

In various embodiments, a wood laminate sheet includes thin wood or substantially wood constructed veneer sheets made of wood scrap material formed and bonded into panels commonly referred to as OSB (oriented strand board); or panels of solid wood formed by cutting thin veneer sheets from larger timbers used for the construction of plywood.

The following description of the embodiment(s) is merely exemplary (illustrative) in nature and is in no way intended to limit the invention, its application, or uses. Additionally, the invention may be practiced according to the claims without some or all of the illustrative information. Various embodiments employ multiple layers of wood veneer sheeting stacked in alternating grain directions with wire mesh inserted between alternating layers and adhered or bonded to each other utilizing wood glue, epoxy, or other approved adhesives utilized in the bonding of plywood panels. As annotated industry accepted standard plywood dimensions such as four (4) feet by eight (8) feet are typically utilized but not a limiting factor, with desired thickness achieved by increasing the number of layers of wood veneer sheets and wire mesh utilized. Minimally two (2) wire mesh sheets, separated by one (1) or more wood veneer sheets, with one (1) or more wood veneer sheets utilized to form the outer layers of the plywood structure.

Figure 1:
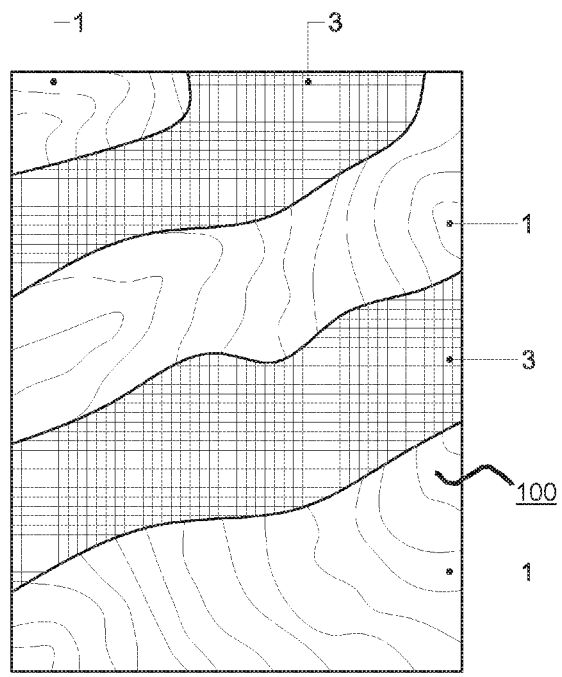
FIG. 1 illustrates a plan view of a sheet of plywood showing the layering of materials, in accordance with various embodiments described herein.
Figure 2:
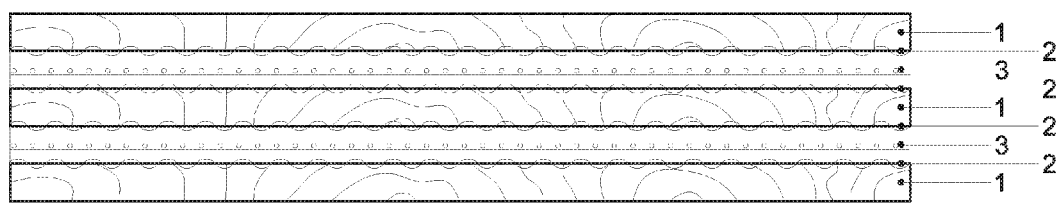
FIG. 2 illustrates a side view of a sheet of plywood as shown in FIG. 1, in accordance with various embodiments described herein.

FIG. 1 and FIG. 2 illustrate an example of Board 100, in accordance with the various embodiments. Example Board 100, comprises wood veneer sheet 1, a wire mesh sheet 2, wood veneer sheet 1, with wood glue, epoxy or other appropriate adhesive 3, applied so as to bond the two sheets of wood veneer and the wire mesh to each other, followed by another wire mesh sheet 2, and wood veneer sheet 1, with wood glue, epoxy or other appropriate adhesive 3, applied so as to bond the two sheets of wood veneer and wire mesh to each other. This entire assembly is then subjected to a calculated amount of compression and heat so as to bond and cure the assembly and adhesive into a single congruent structure.

Figure 3:
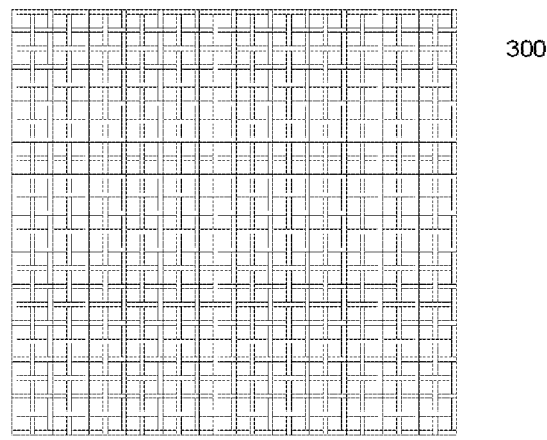
FIG. 3 illustrates a possible variation of the metal wire mesh employed in the laminated layers, in accordance with various embodiments described herein.

FIG. 3 illustrates an exemplary wire mesh sheet that is located in between two sheets of plywood (or another material, as described above). A wire mesh can be of any thickness or material, and is typically made of a metal or metal alloy. Various amounts of mesh sheet can be used in between Boards 100.

Figure 4:
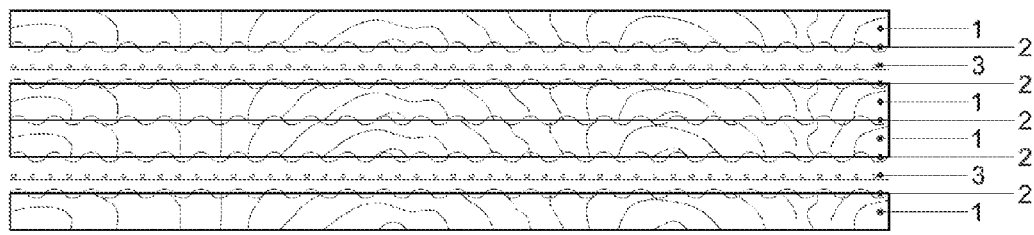
FIG. 4 illustrates a side view of a possible variation of wood veneer arraignments to achieve desired thickness's

FIG. 4 illustrates a possible alternate Board 100 assembly where in additional wood veneer sheets are utilized to increase the plywood thickness to achieve desired results. In this example the structure comprises of wood veneer sheet 1, a wire mesh sheet 2, wood veneer sheet 1, with wood glue, epoxy or other appropriate adhesive 3, applied so as to bond the two sheets of wood veneer and the wire mesh to each other, with an additional wood veneer sheet added to the assembly, with wood glue, epoxy or other appropriate adhesive 3, applied so as to bond the two sheets of wood veneer to each other, followed by another wire mesh sheet 2, and wood veneer sheet 1, with wood glue, epoxy or other appropriate adhesive 3, applied so as to bond the two sheets of wood veneer and wire mesh to each other.

Figure 5:
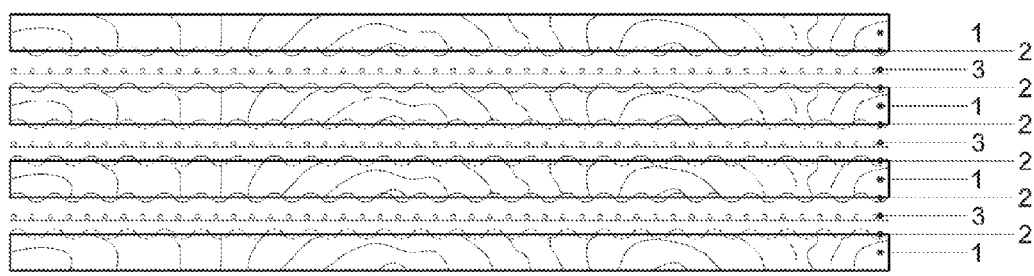
FIG. 5 illustrates a side view of a possible variation to include a third wire mesh sheet to achieve desired strength or rigidity.

FIG. 5 illustrates another possible alternate assembly where in a third wire mesh sheet is utilized. In this example the structure comprises of wood veneer sheet 1, a wire mesh sheet 2, wood veneer sheet 1, with wood glue, epoxy or other appropriate adhesive 3, applied so as to bond the two sheets of wood veneer and the wire mesh to each other, with an additional wire mesh sheet 2 added to the assembly, with wood glue, epoxy or other appropriate adhesive 3, applied so as to bond the two sheets of wood veneer to each other, followed by another wire mesh sheet 2, and wood veneer sheet 1, with wood glue, epoxy or other appropriate adhesive 3, applied so as to bond the two sheets of wood veneer and wire mesh to each other.

What is claimed is:

1. A reinforced plywood panel comprising:
   a first sheet;
   a second sheet;
   a third sheet;
   a fourth sheet;
   a first mesh bonded with the first sheet and the second sheet using a first layer of glue;
   a second mesh bonded with the second sheet and the third sheet, wherein the material between the second sheet and the third sheet consists of the second mesh; and
   a third mesh bonded with the third sheet and the fourth sheet using a second layer of glue.

2. The panel of claim 1, wherein the first sheet, the second sheet, the third sheet and the fourth sheet include a material selected from the group consisting of:
   solid wood veneer sheets, bonded wood chip veneer sheets, laminate bamboo sheets.

3. The panel of claim 1, wherein the first mesh, the second mesh and the third mesh utilized between the first sheet, second sheet, third sheet and the fourth sheet include a material selected from the group consisting of:
   steel, metal alloy, and aluminum.

4. The panel of claim 1, wherein each of the first mesh, the second mesh and the third mesh comprises a first group of wires and a second group of wires, wherein the first group of wires are positioned such that the direction of the first group of the wires are in a different direction than the second group of wires.

* * * * *

UNITED STATES PATENT AND TRADEMARK OFFICE
CERTIFICATE OF CORRECTION

PATENT NO.        : 9,434,136 B1
APPLICATION NO.   : 14/742430
DATED             : September 6, 2016
INVENTOR(S)       : Monte Philip Dauer It is certified that error appears in the above-identified patent and that said Letters Patent is hereby corrected as shown below:

On the Title Page

At Inventor name:
"Monte Phillip Dauer" is replaced with corrected name "Monte Philip Dauer".

Signed and Sealed this
Twenty-sixth Day of June, 2018

Andrei Iancu
*Director of the United States Patent and Trademark Office*